Oct. 30, 1956  L. N. JAMES  2,768,591
FUMIGATION SHOE AND HOOD
Filed May 6, 1952  2 Sheets-Sheet 2

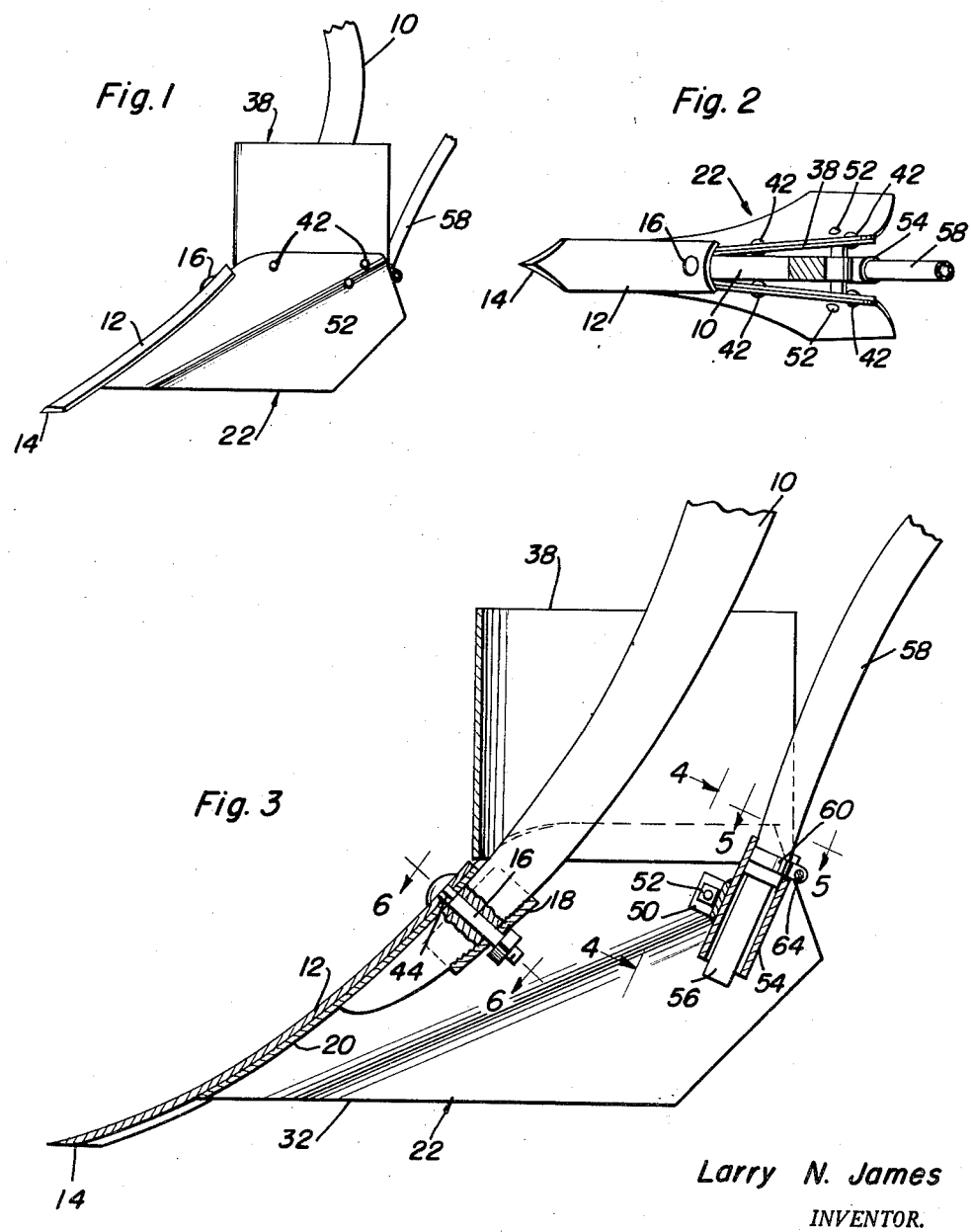

Larry N. James
INVENTOR.

BY
Attorneys

United States Patent Office 2,768,591
Patented Oct. 30, 1956

1

2,768,591

FUMIGATION SHOE AND HOOD

Larry N. James, Bethel, N. C.

Application May 6, 1952, Serial No. 286,333

2 Claims. (Cl. 111—7)

This invention relates in general to soil treating implements, and more specifically to a soil treating implement with which liquid fumigants and fertilizers may be sprayed into the ground.

In many parts of the country, particularly the southern portion, the crops are being damaged by particularly troublesome soil pests called a nematode or eel worm. The nematodes are of a microscopic size and may be destroyed only by fumigating the soil. In order to properly fumigate the soil, it is necessary that liquid soil fumigants be sprayed into the soil below the surface thereof. While there have been devised numerous implements for the spraying of fumigants beneath the surface of the soil, the implements now in use spray the liquid fumigants in a solid stream into the soil and relies upon the seepage thereof to adjoining areas. This method not only requires a large quantity of soil fumigant, but does not effectively fumigate all of the soil in that the fumigant does not properly distribute itself after being sprayed into the soil. Therefore it is desirable to provide a fumigation shoe with which soil may effectively fumigated in order to destroy soil pests such as nematodes and the like.

The primary object of this invention is to provide an improved implement for spraying soil fumigants below the surface of the ground, said implement permitting the spraying of the fumigant over a realtively wide area whereby the distribution of the fumigant throughout the soil is assured.

Another object of this invention is to provide an improved fumigation shoe which may be utilized with a conventional cultivator tool for subsoil fumigation, said shoe having mounted thereon a spray nozzle for spraying soil fumigant below the surface of the ground.

Another object of this invention is to provide a novel connection means between a spray nozzle and a fumigation shoe, said spray nozzle having a rectangular opening whose longitudinal axis extends transversely of the shoe and is retained in that position by a sleeve carried by said shoe.

A further object of this invention is to provide an improved fumigation shoe adapted for use with a cultivator tool, said fumigation shoe having side walls with vertical upper portions and outwardly flared lower portions whereby a wide groove is temporarily formed in the soil and at the same time the disturbed soil is permitted to fall back into its natural position and fill the groove formed by the shoe.

With these objects definitely in view, this invention resides in certain novel features of construction, combination and arrangement of elements and portions as will be hereinafter described in detail in the specification, particularly pointed out in the appended claims, and illustrated in the accompanying drawings which form a material part of this application and in which:

Figure 1 is a side elevational view of the lower portion of a cultivator shank showing the fumigation means at-

2 tached thereto, the fumigation means including a fumigation shoe, a hood, and spray apparatus;

Figure 2 is a top plan view of the fumigation implement of Figure 1 and shows the general construction thereof;

Figure 3 is an enlarged fragmentary longitudinal vertical sectional view taken substantially along the center line of the fumigation implement of Figure 2 and shows the manner in which the various elements thereof are secured together;

Similar characters of reference designate similar or identical elements and portions throughout the specification and throughout the different views of the drawings.

Figure 4:
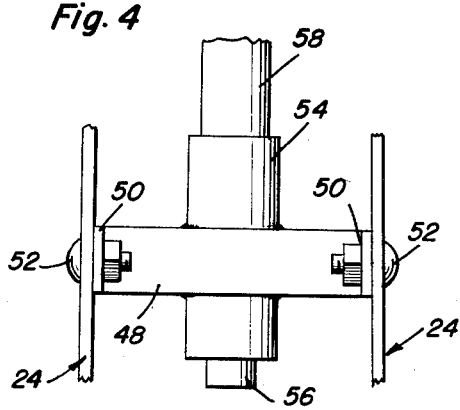
Figure 4 is an enlarged fragmentary transverse vertical sectional view taken substantially upon the plane indicated by the section line 4—4 of Figure 3 and shows the manner in which a spray nozzle retaining sleeve is mounted between the side walls of the fumigation shoe adjacent the rear ends thereof.

Referring now to the drawings in detail, it will be seen that there is illustrated in Figures 1, 2 and 3 a fumigation implement adapted to be utilized in subsoil fumigation. The fumigation implement includes a shank 10 of a cultivator tool, the shank 10 being adapted to be either carried by the hydraulic lift bar of a tractor (not shown) or portion of a conventional cultivator (not shown) drawn behind a tractor. Normally removably secured to the lower end of the shank 10 is a subsoil shovel 12 having a chisel point 14. It will be understood that the subsoil shovel 12, while being illustrated as secured to the lower portion of the shank 10 by a fastener 16 and a clamp element 18, is secured to the shank 10 in numerous different manners by various manufacturers. However, in all installations the subsoil shovel 12 is secured directly to its supporting means by a fastener such as the fastener 16. Mounted on the lower end of the shank 10 with the front portion 20 thereof disposed between the subsoil shovel 12 and the lower end of the shank 10 is a ground spreading fumigation shoe, which is referred to in general by the reference numeral 22.

Figure 7:
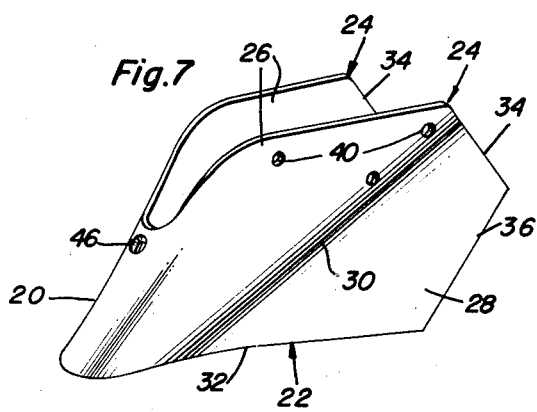
Figure 7 is a perspective view on a large scale of the fumigation shoe illustrated in Figure 1 and shows the general construction thereof.
Figure 8:
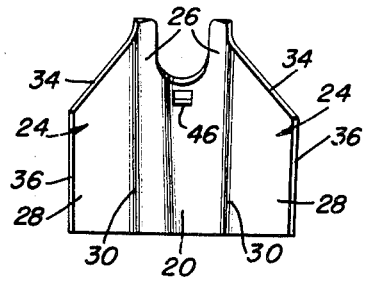
Figure 8 is a rear elevational view of the fumigation shoe of Figure 7.
Figure 9:
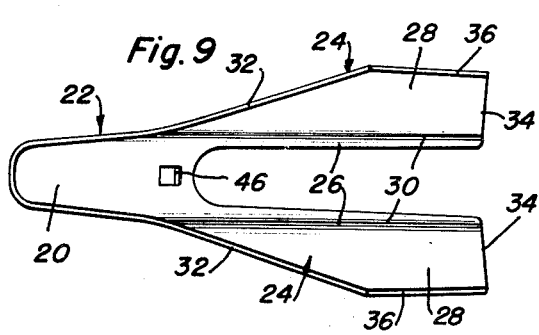
Figure 9 is a bottom plan view of the fumigation shoe of Figure 7 and shows the outward flaring of the lower portion of the side walls thereof.

Referring now to Figures 7, 8 and 9 in particular, it will be seen that the fumigation shoe 22 includes a pair of spaced side walls, which are referred to in general by the reference numeral 24, the side walls 24 being joined at their forward ends by the forward portion 20. The forward portion 20 slopes downwardly and forwardly and is transversely curved. The side walls 24 each have a vertical upper portion 26 and an outwardly flared lower portion 28, the lower rear portion 28 intersecting the vertical upper portion 26 along a straight line 30 which extends from the bottom edge 32 of the side wall 24 at a point rearwardly of the front portion 20 to a point adjacent the rear upper corner of the side wall 24. Each side wall 24 terminates in a downwardly and rearwardly extending rear edge 34 which extends partially of the height of the side wall. The remainder of the side wall 24 terminates in an upwardly and rearwardly extending rear edge 36 which intersects the rear edge 34, the rear edges 36 and side walls 24 being in spaced, generally parallel relation.

Referring again to Figure 3 in particular, it will be seen that the contour of the front portion 20 of the fumigation shoe 22 corresponds to that of the upper portion of the subsoil shovel 12 and that the base 32 of the fumigation shoe 22 is disposed above the chisel point 14 of the subsoil shovel 12. As the chisel point 14 of the subsoil shovel 12 moves through the soil the ground is broken and the fumigation shoe 22 acting as a wedge causes the formation of a groove in the soil, said groove being the widest at its bottom due to the action of the outwardly flared lower portion 28 of the fumigation shoe 22. The primary purpose of the upper portions 26 of the fumigation shoe 22 is to prevent the soil from falling into the groove until the fumigation shoe 22 has passed. Then the soil, which is no longer supported by the fumigation shoe 22 is free to fall into the groove formed by the fumigation shoe and closes the same. It will be understood that the depth of the chisel point 14 of the subsoil shovel 12 with respect to the surface of the soil may be varied and in cases where the depth is such that the upper edge of the fumigation shoe 22 would be disposed below or substantially even with the surface of the soil, it is provided with a vertically extending hood, which is referred to in general by reference numeral 38. The hood 38 is generally U-shaped in horizontal cross-section and is telescoped within the upper portion of the fumigation shoe 22 and extends upwardly as continuations of the side walls 24 thereof. In order that the hood 36 may be properly fitted to the fumigation shoe 22, the upper portion of the front portion 20 thereof is omitted. The fumigation shoe has a plurality of apertures 40 formed in the side walls 24 thereof through which pass fasteners 42 which secure the hood 38 to the fumigation shoe 22 in the proper position. The hood 38 and the fumigation shoe 22 are maintained in their proper position with respect to the shank 10 due to the action of a square shoulder 44 on the fastener 16 which seats in a square opening 46 in the front portion 20 thereof.

In order that the fumigation shoe 22 and the other associated portions of the fumigation implement may be utilized for fumigation purposes, there is mounted between the side walls 24 the fumigation shoe 22 adjacent the rear ends thereof a supporting bracket 48. The supporting bracket 48 has a pair of forwardly extending flanges 50 which engage the inner surfaces of the side walls 24 of the fumigation shoe and are secured thereto by fasteners 52. Secured to the rear side of the supporting bracket 48 at the midpoint thereof is an outwardly extending sleeve 54. The sleeve 54 has positioned therein a spray nozzle 56 which may be utilized for spraying soil fumigants.

Figure 5:
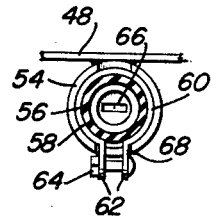
Figure 5 is an enlarged fragmentary transverse horizontal sectional view taken substantially upon the plane indicated by the section line 5—5 of Figure 3 and shows the relationship of the spray nozzle to its associated sleeve.
Figure 6:
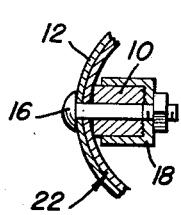
Figure 6 is a transverse sectional view taken substantially upon the plane indicated by the section line 6—6 of Figure 3 and shows the relationship of the front portion of the fumigation shoe with respect to the subsoil shovel and shank of the cultivator tool and means for securing the same together.

As is best illustrated in Figures 3 and 5, the spray nozzle 56 is secured to the lower end of a fumigant supply line 58 by a conventional hose clamp 60. The hose clamp 60 is generally circular in outline and has a pair of rearwardly extending wing flanges 62 which are connected by a fastener 64 to clamp the fumigant supply line 58 to the upper end of the spray nozzle 56. It will be noted that the spray nozzle 56 is provided with a rectangular spray opening 66 in the lower end thereof through which fumigants are sprayed, the longitudinal axis of the opening 66 being transverse to the longitudinal axis of the fumigation shoe 22. In order that the spray nozzle 56 may be retained in this position, the upper portion of the sleeve 54 at the rear thereof is provided with an upwardly open notch 68 in which are received the wing flanges 62 of the hose clamp 60.

It will be understood that the fumigant supply line 58 for the spray nozzle 56 is connected to a source of soil fumigant which is under pressure and that the same is being sprayed from the spray nozzle 56 as the fumigation shoe 22 moves through the soil. Inasmuch as the novel design of the fumigation shoe 22 permits the wide spreading of the soil directly below the spray nozzle 56, and in view of the rectangular spray opening 66, the soil fumigant may be sprayed over a relatively wide area with the fumigation implement, which is the subject of this invention. The spraying of the soil fumigant over a wide area assures the proper distribution of the soil fumigant.

While the implement illustrated and described herein has been limited to use in soil fumigation work, it will be understood that it is not intended to so limit the invention as the spray nozzle 56 may be utilized equally as well for the spraying of liquid fertilizers.

The operation of this device will be understood from the foregoing description of the details thereof, taken in connection with the above recited objects and the drawings. Further description would appear to be unnecessary.

Minor modifications of the device, varying in minor details from the embodiment of the device illustrated and described here, may be resorted to without departure from the spirit and scope of this invention, as defined in the appended claims.

Having described the invention, what is claimed as new is:

1. A soil treating device comprising a soil spreading shoe for attachment to a cultivator tool, said shoe comprising a pair of spaced vertical side walls joined at their forward ends by a downwardly and forwardly sloping front portion, the upper portions of said side walls extending vertically to temporarily prevent soil from falling in a groove shaped by the front portion thereof, and said vertical side walls terminating in outwardly flared lower rear portions, a spray nozzle supported between said rear portions, said spray nozzle having a transversely elongated spray path extending between said outwardly flared lower rear portions, an elongated tubular sleeve operatively mounted between said rear portions for positioning and supporting said spray nozzle, said sleeve and said spray nozzle including complementally formed interlocking means for precluding movement of said spray nozzle about a longitudinal axis, and support means affixed to said elongated tubular sleeve and operatively affixed to said lower rear portions for adjustably positioning the spray nozzle with respect to said outwardly flared rear portions of said soil spreading shoe.

2. A soil treating device comprising a soil spreading shoe for attachment to a cultivator tool, said shoe including a pair of spaced vertical side walls joined at their forward ends by a downwardly and forwardly sloping front portion, the upper portions of said side walls extending vertically to temporarily prevent soil from falling in a groove shaped by the front portion thereof, and said vertical side walls terminating in outwardly flared lower rear portions, a spray nozzle supported between said rear portions, said spray nozzle having a transversely elongated spray path extending between said outwardly flared lower rear portions, an elongated tubular sleeve operatively mounted between said rear portions for positioning and supporting said spray nozzle, said sleeve and said spray nozzle including interlocking means for precluding movement of said spray nozzle about a longitudinal axis, a vertically disposed U-shaped hood mounted with the legs thereof secured to the inner surfaces of the vertical side walls adjacent the upper edges thereof, said hood forming a continuation of said side walls, and support means affixed to said elongated tubular sleeve and operatively affixed to said lower rear portions for adjustably positioning the spray nozzle with respect to said outwardly flared rear portions of said soil spreading shoe.

References Cited in the file of this patent

UNITED STATES PATENTS

| Number | Name | Date |
|---|---|---|
| 105,365 | Piper | July 12, 1870 |
| 334,683 | Williams | Jan. 19, 1886 |
| 514,798 | Whitman | Feb. 13, 1894 |
| 537,739 | Witters | Apr. 16, 1895 |
| 555,897 | Crane | Mar. 3, 1896 |
| 719,995 | Carroll | Feb. 10, 1903 |
| 960,150 | Binks | May 31, 1910 |
| 1,014,655 | Larose | Jan. 16, 1912 |
| 1,047,816 | Kerian | Dec. 17, 1912 |
| 1,102,924 | Hooks | July 7, 1914 |
| 1,172,553 | Pistek et al. | Feb. 22, 1916 |
| 1,276,245 | Millard et al. | Aug. 20, 1918 |
| 1,324,902 | Kelly | Dec. 16, 1919 |
| 1,722,463 | Garrett | July 30, 1929 |
| 1,799,642 | Remillard | Apr. 7, 1931 |
| 1,962,116 | Atwater | June 12, 1934 |
| 2,322,332 | White | June 22, 1943 |
| 2,646,012 | Ingalls | July 21, 1953 |

FOREIGN PATENTS

| Number | Country | Date |
|---|---|---|
| 23,573 | Germany | Feb. 2, 1883 |
| 23,960 | Denmark | Jan. 6, 1919 |